(12) United States Patent
Kugel

(10) Patent No.: US 9,037,686 B2
(45) Date of Patent: May 19, 2015

(54) PORTABLE DEVICE INTEGRATED WITH A PROVISIONING APPLICATION TO AID IN DISCOVERY OF NON-NETWORK ATTACHED RESOURCES AND PROVIDE SUGGESTIONS FOR PHYSICAL SETUP OF THE RESOURCES BASED ON DATA CENTER NEEDS

(75) Inventor: Jacob Kugel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 892 days.

(21) Appl. No.: 12/144,790

(22) Filed: Jun. 24, 2008

(65) Prior Publication Data

US 2009/0319640 A1 Dec. 24, 2009

(51) Int. Cl.
*G06F 15/177* (2006.01)
*H04L 12/24* (2006.01)
*G06F 15/16* (2006.01)
*H04L 12/28* (2006.01)
*G06F 9/00* (2006.01)
*G06F 9/24* (2006.01)
*G06Q 10/08* (2012.01)

(52) U.S. Cl.
CPC ............ *H04L 41/085* (2013.01); *G06Q 10/087* (2013.01); *H04L 41/0806* (2013.01); *H04L 41/12* (2013.01)

(58) Field of Classification Search
CPC ............................. G06Q 10/087; H04W 64/00
USPC ................ 709/220, 228, 226; 370/254; 713/1
See application file for complete search history.

(56) References Cited

U.S. PATENT DOCUMENTS

| 6,473,797 B1* | 10/2002 | Hirasawa ....................... 709/224 |
| 6,662,240 B1 | 12/2003 | Siefert |
| 6,937,985 B2* | 8/2005 | Kuma ........................... 704/275 |
| 7,315,887 B1* | 1/2008 | Liang et al. ................... 709/223 |
| 2004/0205191 A1 | 10/2004 | Smith et al. |
| 2004/0236547 A1* | 11/2004 | Rappaport et al. ................ 703/2 |
| 2005/0235248 A1* | 10/2005 | Victoria et al. ............... 717/102 |
| 2006/0143299 A1 | 6/2006 | Jones et al. |
| 2007/0022185 A1 | 1/2007 | Hamilton et al. |
| 2007/0067442 A1* | 3/2007 | Lippincott .................... 709/224 |
| 2007/0118643 A1* | 5/2007 | Mishra et al. ................. 709/224 |
| 2007/0239569 A1* | 10/2007 | Lucas et al. ..................... 705/28 |

* cited by examiner

*Primary Examiner* — Evans Desrosiers
*Assistant Examiner* — Lawrence Cosby
(74) *Attorney, Agent, or Firm* — Rabin & Berdo, P.C.

(57) ABSTRACT

A portable, e.g. handheld, device that would assist in the discovery of hardware 'in the box', and non-connected resources in general, by using detection methods such as scanning a barcode, manually entering a UPC, or detecting an RFID tag on the asset or resource, and then recommending the physical location, cabling and other setup information based on datacenter needs and real-time load information and displaying the instructions on the portable device. The above-mentioned portable device may also include a GPS receiver to locate various resources, i.e. pieces of hardware, based on their location in a large datacenter.

6 Claims, 5 Drawing Sheets

PORTABLE DEVICE INTEGRATED WITH A PROVISIONING APPLICATION TO AID IN DISCOVERY OF NON-NETWORK ATTACHED RESOURCES AND PROVIDE SUGGESTIONS FOR PHYSICAL SETUP OF THE RESOURCES BASED ON DATA CENTER NEEDS

BACKGROUND OF THE INVENTION

1. Field of the Invention

The invention relates to a portable device, such as a handheld device integrated with a provisioning application to aid in discovery non-network attached resources and providing suggestions for physical setup of the device based on data center needs.

2. Background Information

Management and provisioning software, such as for example Tivoli Provisioning Manager (TPM), helps a system administrator install, deploy, and maintain hardware and software in a heterogeneous environment (e.g. a datacenter). From a central console, switches and load balancers can be initialized, operating systems and software products can be installed, the network can be configured, and patches can be applied.

Such software does a good job of discovering existing network-attached resources and allowing the user to manage these resources. However there are instances where the hardware is not yet on the network (e.g. a new server has arrived and is still in the box). In this situation, the provisioning server cannot normally assist until after the resource is attached to the network.

SUMMARY OF THE INVENTION

It is, therefore, a principle object of this invention to provide a portable device integrated with a provisioning application to aid in discovery of non-network attached resources and to provide suggestions for physical setup of the resources based on data center needs.

It is another object of the invention to provide a handheld device, which is in communication with the provisioning server, which would assist in the discovery and recommendations for the physical location, cabling, and other setup based on datacenter needs known by the provisioning server.

These and other objects of the present invention are accomplished by the portable device disclosed herein.

In an exemplary aspect of the invention, a portable device is provided which would assist in the discovery of hardware 'in the box' or otherwise not yet connected to the network, by using various detection methods such as scanning a barcode, manually entering a UPC, or detecting an RFID tag on the asset, and which recommends the physical location, cabling and other setup information based on datacenter needs and real-time load information and displays the instructions on the portable device. The above-mentioned portable device may also be provided with, for example, a GPS receiver to locate various pieces of hardware based on their location in a large datacenter or the like.

DETAILED DESCRIPTION OF THE PREFERRED EMBODIMENTS

Figure 1:
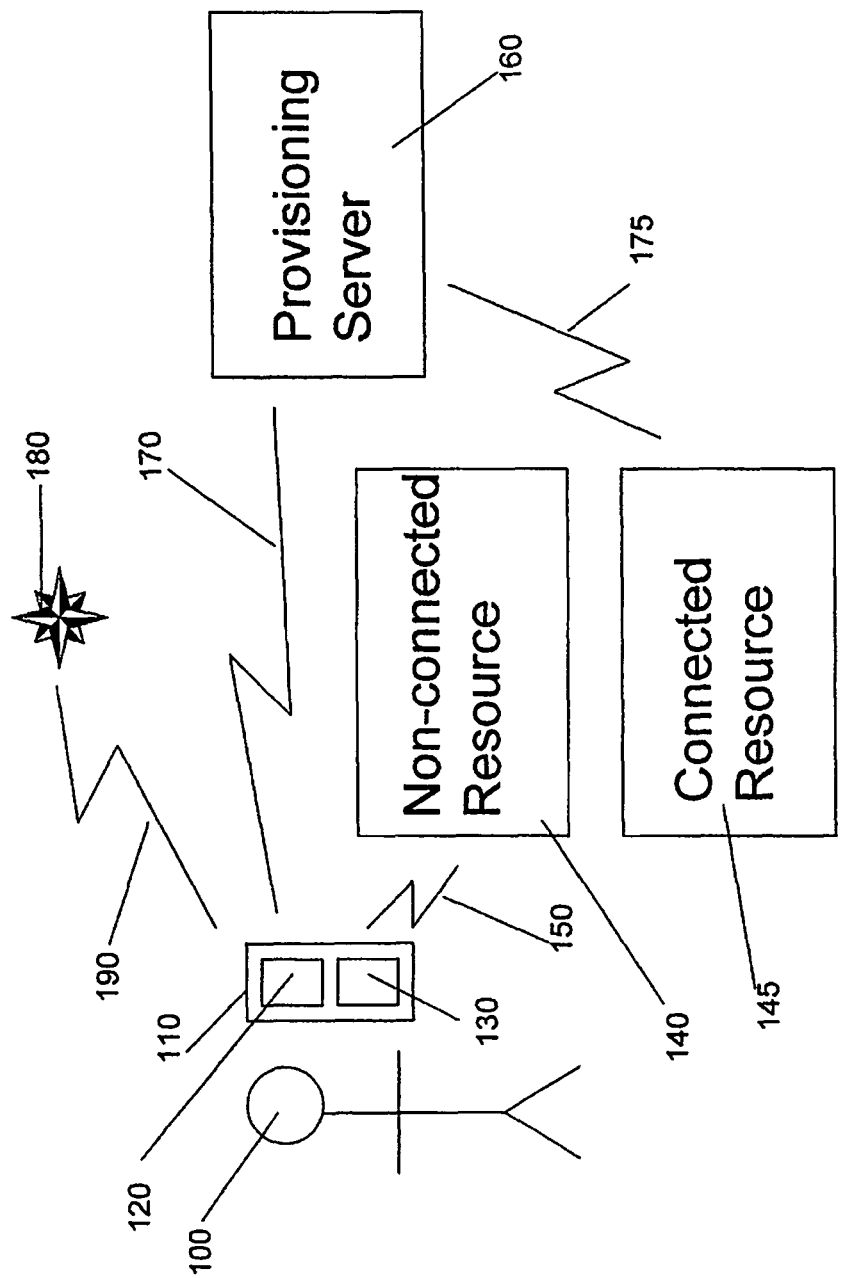
FIG. 1 shows a system according to a preferred embodiment of the invention

The invention will now be described in more detail by way of example with reference to the embodiments shown in the accompanying figures. It should be kept in mind that the following described embodiments are only presented by way of example and should not be construed as limiting the inventive concept to any particular physical configuration.

Further, if used and unless otherwise stated, the terms "upper," "lower," "front," "back," "over," "under," and similar such terms are not to be construed as limiting the invention to a particular orientation. Instead, these terms are used only on a relative basis.

The present invention is directed toward a portable, preferably handheld, device integrated with a provisioning application to aid in discovery of non-network attached resources and to provide suggestions for physical setup of these resources based on data center needs. In a preferred embodiment, the provisioning application may be run on a provisioning server that stores a model of a data center.

Firstly, the portable device aids in discovering the piece of hardware and populating the information into the provisioning server's data center model. The portable device may use various different detection methods, for example, scanning a barcode, manually entering a UPC or an alphanumeric code such as EANI, or detecting an RFID tag on the asset would identify the piece of hardware. In a preferred embodiment of the invention, the information about the resource would be sent to the provisioning server's datacenter model wirelessly. For example, a cell phone integrated into the portable device may be used to connect to the provisioning server, or the portable device may be connected to the server via a Local Area Network, where the link from the portable device to the LAN may be via radio, e.g. IEEE 802.11 (WiFi) or Bluetooth, or by infra-red, e.g. IrDA. The same form of communication may optionally be used to receive the identifying information from the resource as is used to send this information to the provisioning server. All references to a Local Area Network (LAN) herein should be understood to include a Wide Area Network (WAN) or the Internet.

Secondly, once discovered, the provisioning server could offer recommendations for the physical placement, and cabling of the piece of hardware, to be displayed on the handheld device. These recommendations would be based on the provisioning application's knowledge of the current workloads on existing hardware. Choices could be provided to the user by means of a screen on the handheld device. Some examples might include (these examples are in the case of a new server):

1) Lab 20-3: lab 20-3 is at 80% capacity. Additional servers needed.
2) Lab 15-1: lab 15-1 is at 60% capacity. Additional servers needed.

After a user had selected their choice from the options displayed, the provisioning server could offer additional recommendations for the location and cabling of the new server, e.g.:

1) Place the new server in Lab 20-3.
2) Attach server power cord to Uninterruptible power supply #203A
3) Attach LAN cable to router #203R5.

In additional to the above recommendations, the portable device could also optionally contain a GPS or GLONASS satellite receiver or other navigational device to indicate the current position of the portable device and enable the portable device to indicate the distance and direction to various known fixed points. In this way, the recommendations could also help the administrator to locate various pieces of hardware, or resources, based on their location in a large datacenter or the like. An example of such a recommendation might look like:

1) Place the new server in Lab 20-3 (approximately 30 feet north)
2) Attach server power cord to Uninterruptible power supply #203A (approximately 85 feet northwest)
3) Attach LAN cable to router #203R5. (Approximately 80 feet northwest)

Such a portable device will now be discussed in relation to the drawings. Referring now to FIG. 1, this shows a user 100 with a portable, preferably handheld, device 110 having a screen or display 120 and a keypad or other input device 130. The display 120 may be of any conventional type, and may be made up of discrete units or a screen, and may employ LED, LCD or other known forms of display technology. The input device may be a keypad or keyboard or any other suitable input device, for example it may include a pointing device. Alternatively, or additionally, display 120 may be a touch screen that also acts, wholly or in part, as input device 130. The portable device 110 may detect and identify the non-connected resource 140 via a communications link 150, which may be any of a cellular telephone link, another type of radio link, e.g. IEEE 802.11 (WiFi) or Bluetooth, or an infra-red link, e.g. IrDA, or any other suitable communications link, or by scanning a barcode. Alternatively, the user 100 may visually identify the non-connected resource 140 and enter an identifier code corresponding to the type of the non-connected resource 140 via the input device 130.

The portable device 110 is also connected to the provisioning server 160 via a communications link 170, which may be any of a cellular telephone link, another type of radio link, e.g. IEEE 802.11 (WiFi) or Bluetooth, or an infra-red link, e.g. IrDA, or any other suitable communications link, and may be a direct link to the provisioning server 160 or may be routed via one or more base stations or routers, which may form part of a Local Area Network. This link 170 enables the portable device 110 to send the identifier to the provisioning server 160 and to receive configuration information from the provisioning server 160.

Optionally, the portable device 110 also receives navigational reference signals from the satellite 180, which may represent more than one satellite. Typically, the current position of the portable device 110 can be accurately determined from three such signals received from three such satellites in a well-known manner, and then displayed by the display 120.

Where the recommended configuration suggests connecting the non-connected resource 140 to a connected resource 145, which is already connected to the server via communications link 175, which may be similar to communications link 170, the configuration information sent from the provisioning server 160 would contain information regarding the position of the connected resource 145.

The position information of the connected resource 145, in conjunction with the current position of the portable device 110, is optionally used to provide directions from the portable device 110 to the connected resource 145, which could be calculated either in the provisioning server 160 or in the portable device 110. That is, the user 100 would effectively be provided with directions from the non-connected resource 140 to the connected resource 145 to which the connected resource 140 was to be connected. These directions from the non-connected resource 140 to the connected resource 145 could be in the form of a bearing and a distance or in the form of specific directions from room to room, and if necessary from building to building, i.e. turn left, turn right, etc.

Figure 2:
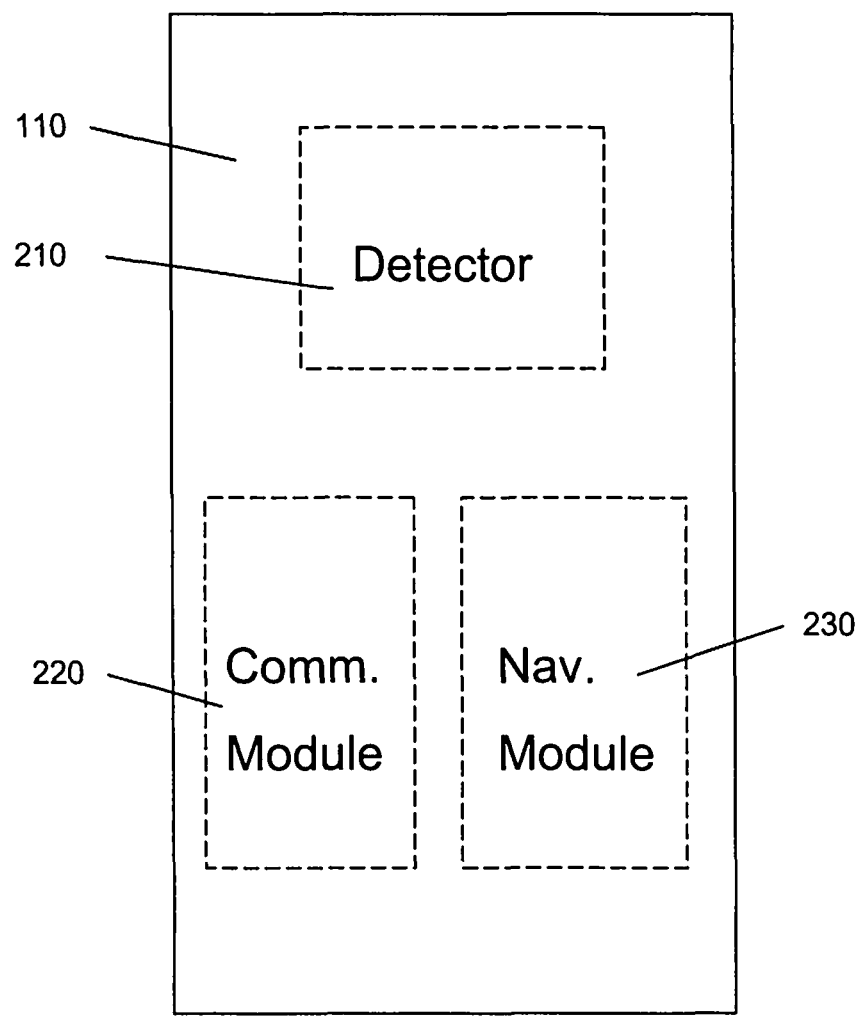
FIG. 2 shows a preferred embodiment of the portable device.

FIG. 2 shows a preferred embodiment of the portable device 110, including a detector 210, a communication module 220 and a navigation module 230.

The detector 210 could detect and identify the non-connected resource 140 via a communications link 150, which may be a radio link, e.g. IEEE 802.11 (WiFi) or Bluetooth, or an infra-red link, e.g. IrDA, or any other suitable communications link, and/or may include a scanner to read the identifier information from a label on non-connected resource 140, having for example, a barcode thereon. The detector 210 may be omitted if the identifier of the non-connected resource 140 is only to be entered via the input device 130 by the user 100, i.e. the input device 130 would fulfill the detector function, but preferably a separate detector 210 would also be provided so that the identifier of the non-connected resource 140 could be also be detected without direct user data entry, and preferably more than one method of detection would be provided. Alternatively, the detector 210 may simply operate as an identifier to read the identification of the non-connected resource 140 after it is located by the user 100.

The communication module 220 would provide a connection to the provisioning server 160 via an integrated cellular telephone, or via IEEE 802.11 (WiFi), Bluetooth or other radio communication, or by infra-red, e.g. IrDA, or by any other type of communications, either directly or via one or more base stations or routers, which may form part of a Local Area Network (LAN) or a Wide Area Network (WAN), or may be connected via the Internet.

The navigation module 230 would locate the current position of the portable device 110 by any suitable means. Typically, but not exclusively, the navigation module would include a satellite navigation receiver to receive navigational reference signals from usually at least three satellites 180, so as to triangulate the current position in a well-known manner. Such navigation satellites 180 could, for example, be part of the GPS (NAVSTAR) system or the GLONASS system. The navigation module could be omitted in some embodiments of the invention where navigational information was not required.

It should be understood that each of the detector 210, the communication module 220 and the navigation module 230 could be separate from each other or combined together in any combination without departing from the scope of the invention. Further, in an alternative embodiment the portable device 110 could be configured to be used with an external navigation receiver. Moreover, it is contemplated within the scope of the invention that each of the detector 210, the communication module 220 and the navigation module 230 could be implemented in any combination of hardware and software, ranging from hardware only implementations to hardware modules with associated software or firmware, to software modules running on a hardware device. It should also be understood that portable device 110 would also of necessity include other circuitry such as power supply circuitry, which may or may not be integrated with the above modules.

Figure 3:
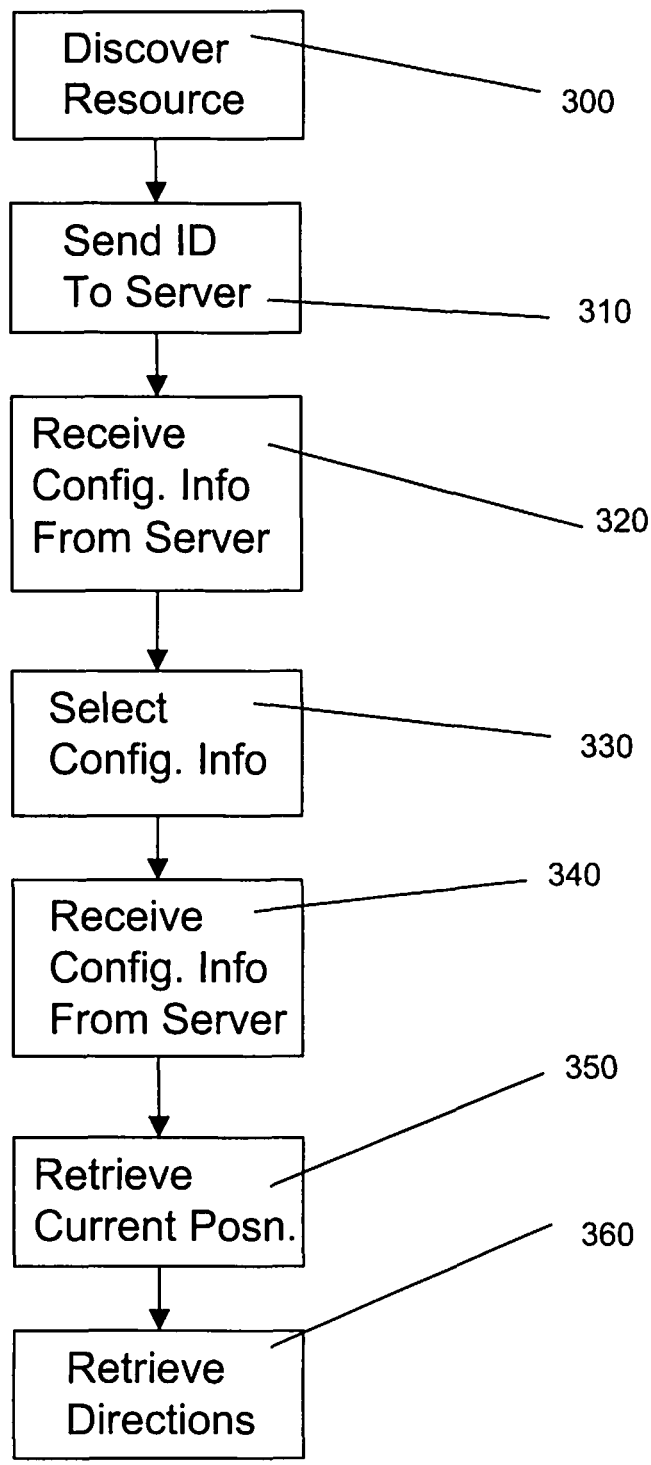
FIG. 3 is a flow chart of operations in a portable device according to a preferred embodiment of the invention.

FIG. 3 is a flow chart according to a preferred embodiment of the invention. In step 300, the portable device 110 discovers a non-connected resource 140 that has not been connected to the network, such as a client computer, or for example a printer or any other peripheral device, and reads an identifier of the non-connected resource 140. The identifier may be a bar code or an RFID tag, or simply a human-readable code that the user 100 enters into portable device 110 via input device 130. Then, in step 310 the identifier of the non-connected resource 140 is sent to the provisioning server 160.

In step 320 the portable device 110 receives configuration information from the provisioning server 160. The configuration information sent from provisioning server 160 at this stage would include a plurality of possible configurations for the installation of non-connected resource 140 on the network, each such configuration identifying, for example, a room or other location (and possibly a building) that non-connected resource 140 can be installed in.

The possible alternative configurations are displayed on screen 120, preferably along with real-time information regarding the computing load at each location, and in step 330, the user 100 selects a configuration for non-connected resource 140 from the configurations displayed on screen 120 by entering an input into input device 130. Then, in step 340, further configuration information is optionally received from provisioning server 160, such as information identifying corresponding equipment for the non-connected resource 140 to be connected to when installed in that particular location, which would typically include, but is not limited to, a power supply and a network router, exemplified by connected resource 145 in FIG. 1.

In optional step 350, the current position of the portable device 110, which essentially closely corresponds to the position of the discovered non-connected resource 140, is obtained by, for example, receiving navigational reference signals from typically three satellites 180 and triangulating the current position in a well-known manner.

Then, in optional step 360, directions to a connected resource 145, i.e. to equipment identified in step 340, are retrieved. This may be done by sending the current position to the provisioning server 160, which then responds with yet further configuration information including the directions, or alternatively, by first retrieving configuration information including the position of connected resource 145 from the provisioning server 160, and then calculating the directions. Such directions may be simply a bearing and a distance, or may include more detailed directions to turn at particular waypoints to reach the physical location of the connected resource 145 from the current position.

Figure 4:
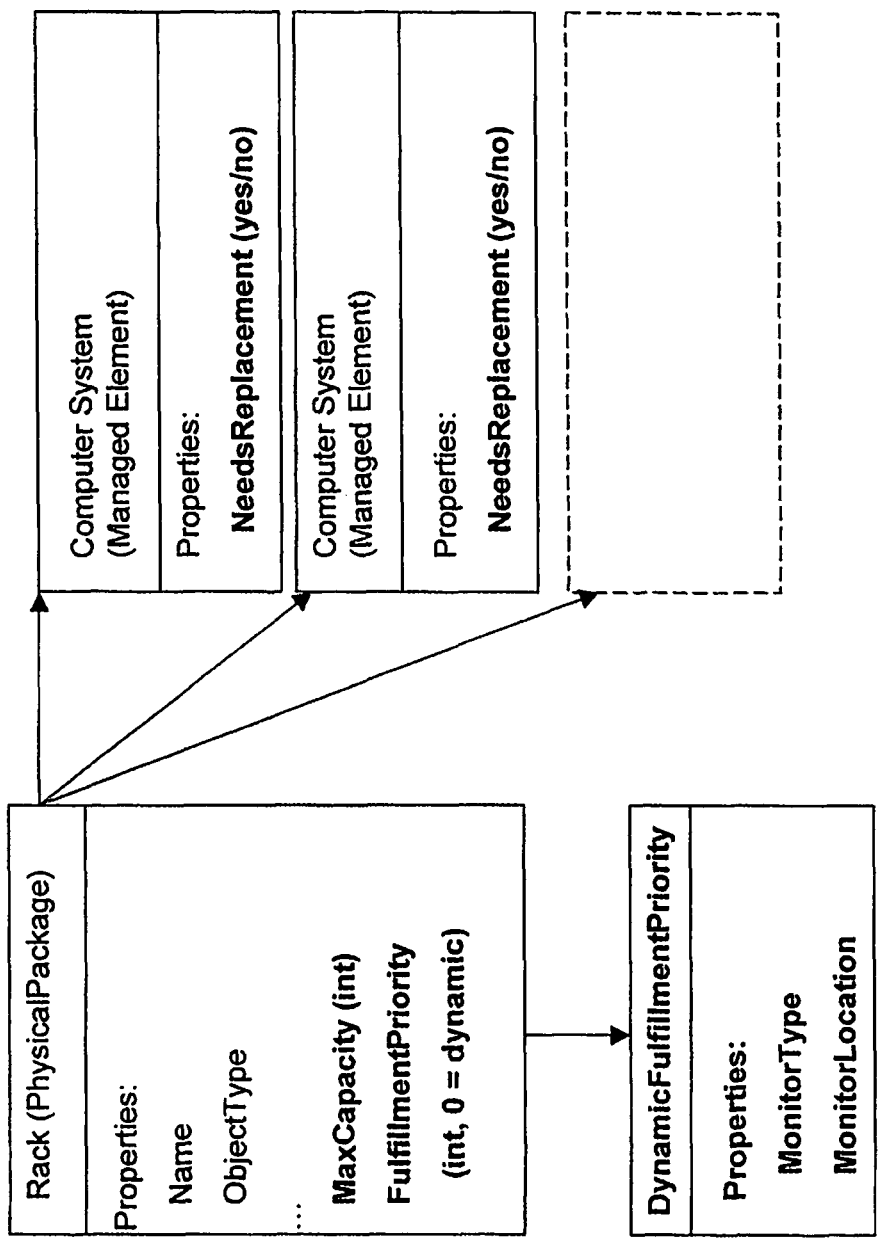
FIG. 4 shows data model changes in a provisioning application to support a preferred embodiment of the invention.

FIG. 4 shows data model changes in a provisioning application to support a preferred embodiment of the invention. More particularly, changes are shown for the Tivoli Provisioning Manager, but it will be appreciated by those skilled in the art that similar changes may be made in other provisioning applications. The properties/classes shown in bold in FIG. 4 are those that would be added in a preferred embodiment of the present invention. This supports a way to model containers that have room for more elements, and, where there are multiple containers, which one has priority to receive a new piece of hardware, or non-connected resource. A container could be a rack, a group of card slots, or the like. DynamicFulfillmentPriority contains information needed to compute a dynamic priority value, e.g., it could point to a Java class that monitors CPU workload.

Figure 5:
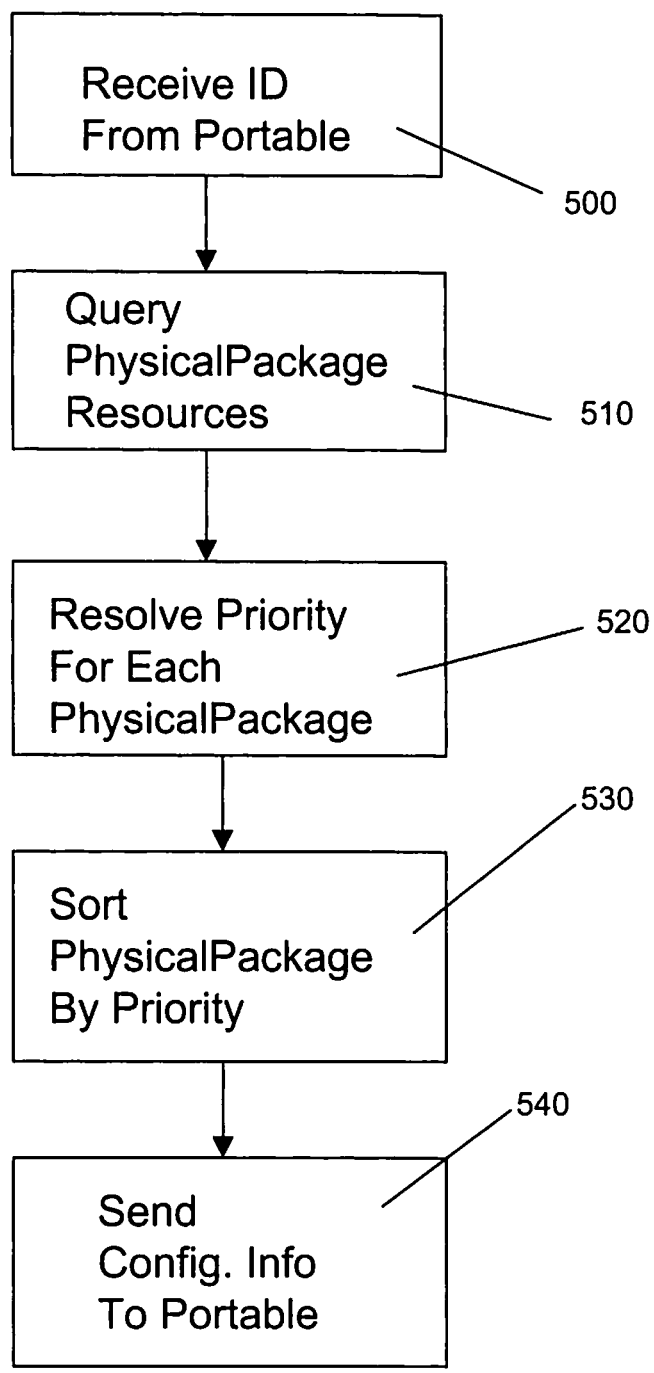
FIG. 5 is a flow chart of operations in a provisioning server according to a preferred embodiment of the invention.

FIG. 5 is a flow chart of operations in a provisioning server according to a preferred embodiment of the invention. In step 500, the provisioning server 160 receives an identifier from the portable device 110. Then, in step 510, the provisioning application queries all PhysicalPackage resources having an ObjectType (the resource type contained therein), and which have unused space (MaxCapacity greater than the number of resources currently contained therein) and if any of the existing components have NeedsReplacement=yes.

Then, in step 520, the priority is resolved for each PhysicalPackage. If the priority of the PhysicalPackage is a static integer, that value is used. If the priority of the PhysicalPackage indicates a DynamicFulfillmentPriority is used, the DynamicFulfillmentPriority is found. This will specify how to retrieve the priority (e.g., either by running a command or executing a Java class). Then, in step 530, each PhysicalPackage is sorted by priority, and the highest priority options are sent back from the provisioning server 160 to the portable device in step 540.

It should be understood, however, that the invention is not necessarily limited to the specific process, arrangement, materials and components shown and described above, but may be susceptible to numerous variations within the scope of the invention. For example, although the above-described exemplary aspects of the invention are believed to be particularly well suited for discovery of non-connected networkable resources in a large datacenter, it is contemplated that the concepts of the present invention can be applied in other applications. For example, the concepts of the present application can be utilized on a smaller or a larger scale.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes and adaptations, and the same are intended to be comprehended within the meaning and range of equivalents of the appended claims.

What is claimed is:

1. A portable device for discovery of resources and for network configuration selection, comprising:

an identifier configured to input an identifier code of a discoverable non-connected resource discovered by the portable device into the portable device, the resource being a networkable hardware device, and to identify a type of the resource from the identifier code, a communication module configured to send the type of the resource from the portable device to a provisioning server and to receive therefrom configuration information including one or more prospective configurations for the resource, wherein the one or more prospective configurations each include real-time load information;

a screen of the portable device displaying the one or more prospective configurations including recommendations for connections between the resource and other equipment;

an input device of the portable device accepting a user input and selecting by a user a desired configuration, including a desired location, from the one or more prospective configurations; and an integrated navigational device, wherein the screen is configured to display a current position of the portable device according to navigational information provided by the navigational device;

the communication module is configured to report the current position to the provisioning server; and the screen is configured to display a distance and a direction from the current position to the desired location according to the navigational information provided by the navigational device and according to the configuration information provided by the provisioning server.

2. The portable device according to claim 1, wherein the navigational device comprises a receiver configured to receive navigational reference signals from geostationary satellites.

3. The portable device according to claim 1, wherein the communication module is an integrated cellular telephone.

4. The portable device according to claim 1, wherein the communication module is a wireless LAN card.

5. A method for discovery of resources and for network configuration selection, comprising:
- inputting an identifier code of a discoverable non-connected resource discovered by a portable device into the portable device, the resource being a networkable hardware device in the vicinity of the portable device, and identifying a type of the resource from the identifier code,
- sending the type of the resource from the portable device to a provisioning server and receiving therefrom configuration information including one or more prospective configurations for the resource, wherein the one or more prospective configurations each include real-time load information;
- displaying the one or more prospective configurations at the portable device;
- selecting a desired configuration, including a desired location, from the one or more prospective configurations according to a user input to the portable device,
- wherein the desired configuration further includes recommendations for connections between the resource and other equipment, and
- wherein the identifier code is selected from the group consisting of a code encoded in an RFID tag, a code transmitted wirelessly by the resource and a code entered into the input device by the user;
- displaying a current position of the portable device at the portable device according to navigational information provided by a navigational device;
- reporting the current position to the provisioning server; and
- displaying at the portable device a distance and a direction from the current position to the desired location according to the navigational information provided by the navigational device and according to the configuration information provided by the provisioning server.

6. A computer program product for discovery of resources and for network configuration selection, the computer program product comprising:
- a non-transitory computer usable medium in a portable device having computer usable program code embodied therewith, the computer usable program code comprising:
    - instructions to input an identifier code of a discoverable non-connected resource discovered by the portable device, the resource being a networkable hardware device in the vicinity of the portable device;
    - instructions to identify a type of the resource from the identifier code,
- instructions to send the type of the resource to a provisioning server and to receive therefrom configuration information including one or more prospective configurations for the resource, wherein the one or more prospective configurations each include real-time load information;
    - instructions to display the one or more prospective configurations at the portable device including recommendations for connections between the resource and other equipment;
    - instructions to select a desired configuration, including a desired location, from the one or more prospective configurations according to a user input to the portable device instructions to display a current position of the portable device according to navigational information provided by a navigational device;
    - instructions to report the current position to the provisioning server; and
    - instructions to display at the portable device a distance and a direction from the current position to the desired location according to the navigational information provided by the navigational device and according to the configuration information provided by the provisioning server.

* * * * *